3,214,281
ANTI-FOULING PAINTS

Masao Nagasawa, Shimizu, Japan, assignor to Ihara Noyaku Kabushiki Kaisha, Shimizu, Japan, a corporation of Japan
No Drawing. Filed Apr. 9, 1963, Ser. No. 271,585
Claims priority, application Japan, Dec. 5, 1962, 37/54,675
6 Claims. (Cl. 106—15)

The present invention relates to anti-fouling paints containing as essential ingredients novel arsenic compounds expressed by the general formula as hereinafter explained.

Anti-fouling paints containing as poisonous agents copper or mercuric inorgano compounds have heretofore been mainly used for the purpose of preventing the deposit of marine living organisms on the bottom of ships and other structures in the sea, but the poisonous substances in such kinds of anti-fouling paints are used in most cases in the form of oxides so that it has possibility of reacting with the varnish component in the paint and is generally unstable, moreover such inorganic compounds usually have large specific gravity so that the poisonous compositions in such kinds of anti-fouling paints deposit during storing and it accompanies inconvenience of thoroughly agitating the paint before using it.

According to the recent remarkable development of chemical industries, water soluble sulfides in the industrial dirty water in a port and bay react with metals, such as, copper, mercury, etc. in the anti-fouling paint to result in discoloration and deterioration to lose anti-fouling effect. Moreover, recently, ships are butl by light alloys containing as esential ingredient, aluminum of magnesium and in such ships the anti-fouling paints containing poisonous agents auch as inorganic copper and mercury, etc. attack and corrode the structural material of the ship bottom electrochemically so that such paints can never be used.

On the other hand, the color tone of the film of such anti-fouling paints has considerable influence on the anti-fouling effect, while conventional anti-fouling paints are almost limited to dark color tone of red brown color based on the cuprous oxide so that it is impossible to add the anti-fouling effect due to coloring.

After long and elaborate experiments and investigations, the inventor has ascertained that the organo arsenic compounds, 5-hydro-10 substituted phenarsazines represented by the general formula

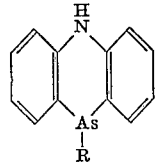

wherein R is a group selected from the group consisting of —CN, —SCN, —XR' (X=O or S, R'=$C_{1-4}$ alkyl), —SC(S)N(CH$_3$)$_2$ and —SC(S)OC$_2$H$_5$, and such organo arsenic compounds can obviate various disadvantages of conventional anti-fouling paints as above described and have excellent anti-fouling effect, and superior to that of known anti-fouling paints. The above compounds have various conditions necessary for anti-fouling paints, i.e., they have the property of uniformly and easily maxing with vehicles, pigments and solvent in the paint without reacting with these agents and coating ability is much better than the conventional paint withoutout delaying drying nature of the paint.

Moreover, the compounds do not cause hydrolysis and other chemical changes in clean sea water and dirty sea water so that they are very stable and maintain the poisonous nature for long periods and never accelerate the corrosion of ship material of light alloys, but exhibits very excellent properties.

The compound of the invention has such poisonous property that according to oral administrative toxity for mice, it corresponds to more than LD 50=300 mg./kg. of DDT generally used as insecticides without substantially affecting human beings.

Halogenated phernarsazine compounds have stimulus nature to mucous membranes, but the present compounds have no such property, thereby making handling of the paint very easy.

5-hydro-10-substituted phenarsazines are shown by the following examples:

5 - hydro - 10 - dimethylthiocarbamoylthiophenarsazine

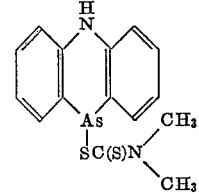

M.P. 212° C., orange yellow color.

5-hydro-10-thiocyanophenarsazine

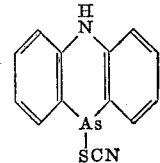

M.P. 235–240° C., light yellow color.

5-hydro-10-methoxyphenarsazine

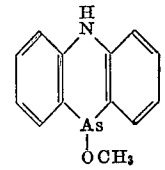

M.P. 194° C., light yellow color.

5-hydro-10-cyanophenarsazine

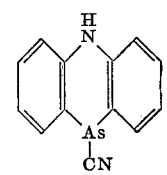

M.P. 227–228° C., yellow color.

5-hydro-10-ethylxanthogenylphenarsazine

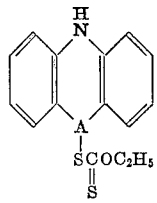

M.P. 250° C., orange brown color.

Such phenarsazine derivatives can be produced by reacting phenarsazine chloride and corresponding alkaline metal salts or ammonium salts and such derivatives can be obtained at a very high yield of 70-95% and the these compounds have yellow or orange color and difficult to soluble or insoluble in water, generally difficult or insoluble in organic solvents.

Anti-fouling effect of these compounds is very excellent and exhibits almost same effect at a concentration of ⅔ to ¼ of that of the poisonous agents used in the conventional anti-fouling paints and is maintained over a very long period as seen from the following examples and also they can be mixed with the other poisonous matter.

The invention will be explained by examples and tests made against living organisms in the following, yet it should be noted that such examples and tests are shown for the sake of understanding of the invention, but not limitative of it.

EXAMPLE 1

Oily anti-fouling paint_____Red rusty color

| | |
|---|---|
| 5 - hydro - 10 - dimethylthiocarbamoylthiophenarsazine | 15.0 |
| Rouge | 20.0 |
| Hydrous aluminum silicate | 5.0 |
| Aluminum stearate | 0.5 |
| Graphite | 0.3 |
| Rosin | 22.0 |
| Boiled oil | 15.0 |
| Solvent naphtha | 22.2 |
| | 100.0 |

EXAMPLE 2

Oily anti-fouling paint_____Green color

| | |
|---|---|
| 5-hydro-10-methoxyphenarsazine | 15.0 |
| Chrome yellow | 6.0 |
| Cyanine green | 4.0 |
| Prussian blue | 2.5 |
| Hydrous aluminum silicate | 5.0 |
| Aluminum stearate | 0.5 |
| Rosin | 26.0 |
| Boiled oil | 12.0 |
| Solvent naphtha | 29.0 |
| | 100.0 |

EXAMPLE 3

Vinyl anti-fouling paint_____Emerald green color

| | |
|---|---|
| 5-hydro-10-thiocyanophenarsazine | 15.0 |
| Titanium white | 8.0 |
| Chrome yellow | 7.0 |
| Cyanine green | 2.5 |
| Vinyl chloride-vinyl acetate copolymerized resin | 9.0 |
| Rosin | 9.0 |
| Tricresyl phosphate | 0.5 |
| Methyl isobutyl ketone | 25.0 |
| Toluole | 24.0 |
| | 100.0 |

EXAMPLE 4

Oily anti-fouling paint_____Sulphur green color

| | |
|---|---|
| 5-hydro-10-cyanophenarsazine | 10.0 |
| Tri - n - butyltin - 2,5 - dimercapto - 1,3,4 - thiadiazole | 5.0 |
| Chrome yellow | 10.0 |
| Cyanine green | 2.0 |
| Prussian blue | 0.5 |
| Hydrous aluminum silicate | 8.0 |
| Aluminum stearate | 0.5 |
| Rosin | 25.0 |
| Boiled oil | 12.0 |
| Solvent naphtha | 27.0 |
| | 100.0 |

The test method of the present compounds as anti-fouling paints for ship bottoms and test results are described as follows:

*Test method*

(1) The test sample of the paint is dosed according to the above described examples and thoroughly crushed and mixed in a potmill.

(2) Preparation of test plates: Polished steel plates of 300 x 100 x 1 mm. are coated with paint prepared according to item 1 with brush according to the following specification and after the completion of coating the sample plate it is fitted in a wooden frame and dipped into sea to a depth of 1.5 m. from the dipping raft.

(3) Specification of painting:

| | Times |
|---|---|
| Wash primer | 1 |
| Ship bottom paint No. 1 | 2 |
| Anti-fouling paint | 2 |

(4) Results after dipping: The coated test plates dipped into sea water are measured for the area on which the living organisms deposited during definite periods and are shown by percentage in the following:

| | Percent | | | | | |
|---|---|---|---|---|---|---|
| Months | 2 | 4 | 6 | 8 | 10 | 11 |
| 5-hydro-10-dimethylthiocarbamoylthiopenarsazine | 0 | 0 | 0 | 0 | 2 | 2 |
| 5-hydro-10-thiocyanophenarsazine | 0 | 0 | 0 | 0 | 1 | 1 |
| 5-hydro-10-cyanophenarsazine | 0 | 0 | 0 | 0 | 1 | 3 |
| 5-hydro-10-methoxyphenarsazine | 0 | 0 | 0 | 0 | 0 | 3 |
| Inorganic copper-mercury compounds (contrast reagent) | 0 | 0 | 0 | 3 | 5 | 8 |
| Untreated | 100 | 100 | 100 | 100 | 100 | 100 |

As apparent from the above test results the anti-fouling paint of the invention sufficiently prevented the deposition of shells, seaweeds even for the dipping duration of 11 months and the coated surface was maintained in a good condition.

What I claim is: :

1. An anti-fouling paint which comprises an anti-fouling ingredient and vehicle, the improvement wherein said anti-fouling ingredient consists essentially of an effective amount of at least one compound of the formula:

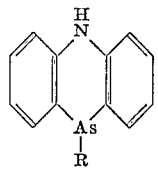

wherein R is a member selected from the group consisting of $-SC(S)N(CH_3)_2$, $-SC(S)OC_2H_5$, $-CN$, $-SCN$ and $-XR'$, wherein X is selected from the group consisting of oxygen and sulfur and R' is an alkyl group containing 1-4 carbon atoms.

2. An anti-fouling paint which comprises an anti-fouling ingredient and vehicle, the improvement wherein said anti-fouling ingredient consists essentially of an effective amount of 5-hydro-10-dimethylthiocarbamoylthiophenarsazine.

3. An anti-fouling paint which comprises an anti-fouling ingredient and vehicle, the improvement wherein said anti-fouling ingredient consists essentially of an effective amount of 5-hydro-10-thiocyanophenarazine.

4. An anti-fouling paint which comprises an anti-fouling ingredient and vehicle, the improvement wherein said anti-fouling ingredient consists essentially of an effective amount of 5-hydro-10-methoxyphenarazine.

5. An anti-fouling paint which comprises an anti-fouling ingredient and vehicle, the improvement wherein said anti-fouling ingredient consists essentially of an effective amount of 5-hydro-10-cyanophenarazine.

6. An anti-fouling paint which comprises an anti-fouling ingredient and vehicle, the improvement wherein said anti-fouling ingredient consists essentially of an effective amount of 5-hydro-10-ethylxanthogenylphenarazine.

References Cited by the Examiner

UNITED STATES PATENTS 3,041,188   6/62   Kageyama et al. _____ 106—15

ALEXANDER H. BRODMERKEL, *Primary Examiner.*

MORRIS LIEBMAN, *Examiner.*